US012248281B2

(12) United States Patent
Zhuang

(10) Patent No.: US 12,248,281 B2
(45) Date of Patent: Mar. 11, 2025

(54) SMART WATCH PROTECTIVE SHELL

(71) Applicant: Guangxiang Zhuang, Shenzhen (CN)

(72) Inventor: Guangxiang Zhuang, Shenzhen (CN)

( * ) Notice: Subject to any disclaimer, the term of this patent is extended or adjusted under 35 U.S.C. 154(b) by 436 days.

(21) Appl. No.: 17/829,384

(22) Filed: Jun. 1, 2022

(65) Prior Publication Data

US 2022/0291639 A1 Sep. 15, 2022

(30) Foreign Application Priority Data

May 20, 2022 (CN) ........................ 202221236811.8

(51) Int. Cl.
*G04G 17/08* (2006.01)

(52) U.S. Cl.
CPC .................................. *G04G 17/08* (2013.01)

(58) Field of Classification Search
CPC ................................ G04G 17/08; A45C 11/10
USPC .................................................. 368/286
See application file for complete search history.

(56) References Cited

U.S. PATENT DOCUMENTS 5,206,841 A * 4/1993 Boucheron .......... G04B 37/005 368/283
9,591,913 B2 * 3/2017 Kim ...................... H02J 7/0048
2012/0002513 A1 1/2012 Behrend et al.
2013/0100782 A1 4/2013 Cattaneo et al.
2015/0177692 A1 6/2015 Goyet et al.
2017/0035156 A1 * 2/2017 Wright ................. A45C 13/008
2020/0019121 A1 * 1/2020 Han ......................... A44C 5/14
2022/0413442 A1 * 12/2022 Khalifa .................. G04B 47/00

FOREIGN PATENT DOCUMENTS

CN 109283838 A * 1/2019 .............. A44C 5/14
CN 110133990 A * 8/2019

* cited by examiner

*Primary Examiner* — Edwin A. Leon
*Assistant Examiner* — Kevin Andrew Johnston
(74) *Attorney, Agent, or Firm* — Hemisphere Law, PLLC; Zhigang Ma

(57) ABSTRACT

Disclosed is a smart watch protective shell, including a main shell, an upper shell and two connectors; the main shell is a hollow cavity and is used for wrapping a smart watch and protecting the smart watch from being damaged; the upper shell is arranged on the main shell; a user watches content on a watch face of the smart watch through the upper shell; the connectors are respectively detachably connected to two ends of the smart watch; and two ends of the main shell are respectively detachably connected to the corresponding connectors to fixedly cover the main shell on the smart watch. According to the present disclosure, the protective shell is fixed on the smart watch, thus achieving zero-frictional removal and mounting of the protective shell and effectively reducing damage of mounting and removal to the smart watch.

11 Claims, 8 Drawing Sheets

SMART WATCH PROTECTIVE SHELL

TECHNICAL FIELD

The present disclosure relates to the technical field of protective shell, in particular to a smart watch protective shell.

BACKGROUND

With the development of mobile technologies, mobile functions are also begun to be added to many traditional electronic products. For example, a smart watch that was only used to check the time in the past can also be connected to an Internet through a smart phone or a home network to display caller information, Twitter and news feeds, weather information, and other content. A smart watch is connected to a network by a built-in intelligent system of the smart watch or by carrying a smart phone system, so as to realize multiple functions. Telephone numbers, text messages, emails, photos, music, and the like in a mobile phone can be synchronized to the smart watch. The smart watch is worn on an arm. When the arm moves, it is easy to scratch the smart watch, resulting in scratches on a case of the smart watch. Furthermore, the smart watch is easily stained by dust and water marks, which affects the appearance of the smart watch. In order to protect the smart watch, a smart watch protective shell is usually sleeved outside the smart watch. It is hard to mount and remove most of the existing smart watch protective shells, and the smart watch can be possibly worn during mounting and removal. Therefore, in view of the deficiencies in the actual manufacturing and implementation of the above-mentioned solutions, the above-mentioned solutions are revised and improved. At the same time, in line with the spirit for good and idea, aided by professional knowledge and experience, after multiple clever thoughts and tests, this design is provided. Therefore, a smart watch protective shell is provided to solve the above-mentioned problems.

SUMMARY

One of the purposes of the present disclosure is to provide a smart watch protective shell, so as to solve the above-mentioned problems.

A smart watch protective shell of the present disclosure can be implemented by the following technical solutions:

A smart watch protective shell of the present disclosure includes a main shell, an upper shell and two connectors; the main shell is a hollow cavity and is used for wrapping a smart watch and protecting the smart watch from being damaged; the upper shell is arranged on the main shell; a user watches content on a watch face of the smart watch through the upper shell; the connectors are respectively detachably connected to two ends of the smart watch; and two ends of the main shell are respectively detachably connected to the corresponding connectors to fixedly cover the main shell on the smart watch.

In one implementation, two opposite sides of the main shell are respectively symmetrically provided with snap-in blocks; the two snap-in blocks are respectively detachably connected to the corresponding connectors; and the main shell is fixedly covered on the smart watch by cooperation between the snap-in blocks and the connectors.

In one implementation, a side edge of the main shell is provided with a plurality of through holes, and positions of the plurality of through holes respectively correspond to a protruding portion on a side edge of the smart watch.

In one implementation, each connector includes an adapter and at least one snap-in slot; the adapter is detachably connected to a side edge of the smart watch; and the at least one snap-in slot is formed in the adapter and cooperates with the corresponding snap-in block to fixedly cover the main shell on the smart watch.

In one implementation, the connector is provided with a fixed shaft; the fixed shaft is detachably arranged on the adapter to fix the adapter on the side edge of the smart watch; and the fixed shaft is connected with a corresponding watchband.

In one implementation, the two snap-in slots are symmetrically formed in the adapter and respectively cooperate with the corresponding snap-in blocks to fixedly cover the main shell on the smart watch.

In one implementation, the upper shell is movably arranged on the main shell; the upper shell is a decorative member; and the content of the watch face of the smart watch can be observed by opening the upper shell.

In one implementation, two sliding slots are symmetrically formed in the main shell in parallel; a side edge of the upper shell is provided with a sliding shaft; and the sliding shaft can move on the two siding slots, so that the upper shell moves relative to the main shell, which is convenient for watching the content of the watch face of the smart watch.

In one implementation, a material of the upper shell is crystal, resin, metal, zircon or agate.

In one implementation, the side edge of the main shell is provided with a rotating shaft; and the upper shell is capable of rotating through the rotating shaft relative to the main shell, which is convenient for watching the content of the watch face of the smart watch.

In one implementation, the upper shell is a protective film.

In one implementation, the upper shell is a tempered glass screen protector.

In one implementation, four fixed feet are respectively symmetrically arranged on the main shell; and the four fixed feet are detachably connected to the corresponding connectors to fixedly cover the main shell on the smart watch.

In one implementation, the connectors are fixed shafts which are arranged on the side edge of the smart watch; the four fixed feet are respectively detachably connected to side edges of the corresponding fixed shafts; and the fixed shafts are connected to a corresponding watchband.

In one implementation, a material of the main shell is a metal or resin.

Compared with the prior art, the smart watch protective shell of the present disclosure has the beneficial effects as follows:

According to the smart watch protective shell of the present disclosure, the protective shell is fixed on the smart watch through the connectors, thus achieving zero-friction removal and mounting of the protective shell and effectively reducing damage of the mounting and removal to the smart watch. At the same time, a decorative member is movably arranged on the main shell, so that a user can customize and replace the decorative member according to an own requirement, and the user experience and the beauty of the protective shell are improved.

BRIEF DESCRIPTION OF THE DRAWINGS

In order to explain the technical solutions of the embodiments of the present disclosure more clearly, the following will briefly introduce the accompanying drawings used in the embodiments. It should be understood that the drawings in the following description only illustrate some embodiments of the present disclosure and thus shall not be deemed as limiting the scope. Those of ordinary skill in the art can obtain other related drawings based on these drawings without creative work.

Figure 1:
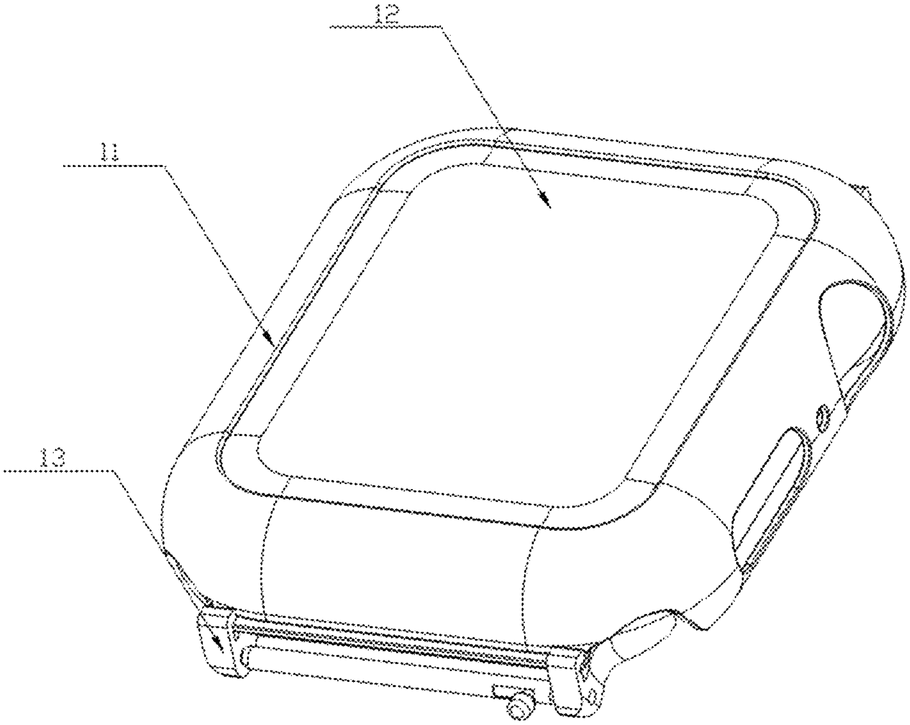
FIG. 1 is a schematic three-dimensional structural diagram of a first embodiment of a smart watch protective shell of the present disclosure.

Reference numerals in the drawings: 11: first main shell; 111: first snap-in block; 112: first through hole; 12: first upper shell; 13: first connector; 131: first adapter; 132: first fixed shaft; 133: first snap-in slot; 21: second main shell; 211: second snap-in block; 212: second trough hole; 213: sliding slot; 22: second upper shell; 221: sliding shaft; 23: second connector; 231: second adapter; 232: second fixed shaft; 233: second snap-in slot; 31: third main shell; 311: third snap-in block; 312: third through hole; 313: rotating shaft; 32: third upper shell; 33: third connector; 331: third adapter; 332: third fixed shaft; 333: third snap-in slot; 41: fourth main shell; 411: fixed foot; 412: fourth through hole; 42: fourth upper shell; and 43: fourth connector.

DETAILED DESCRIPTION OF THE EMBODIMENTS

In order to make the objectives, technical solutions and advantages of the embodiments of the present disclosure clearer, the technical solutions in the embodiments of the present disclosure will be described clearly and completely below in combination with the drawings in the embodiments of the present disclosure. Obviously, the embodiments described herein are part of the embodiments of the present disclosure, not all the embodiments. The components of the embodiments of the present disclosure generally described and shown in the drawings here can be arranged and designed in a variety of different configurations.

Therefore, the following detailed description for the embodiments of the present disclosure provided in the accompanying drawings is not intended to limit the scope of the claimed present disclosure, but merely represents selected embodiments of the present disclosure. Based on the embodiments in the present disclosure, all other embodiments obtained by those of ordinary skill in the art without creative work shall fall within the protection scope of the present disclosure.

It should be noted that similar reference signs and letters indicate similar items in the following drawings. Therefore, once a certain item is defined in one drawing, it is unnecessary to be further defined and explained in the subsequent drawings.

In the description of the present disclosure, it should be noted that orientations or positional relationships indicated by the terms "upper", "lower", and the like are orientations or positional relationships as shown based on the drawings, or orientations or positional relationships where this invention product are usually placed, and are only for the purpose of facilitating and simplifying the description of the present disclosure instead of indicating or implying that devices or elements indicated must have particular orientations, and be constructed and operated in the particular orientations, so that these terms cannot be construed as limiting the present disclosure.

In addition, in the present disclosure, unless otherwise clearly defined and defined, the first feature being above or under the second feature may include that the first and second features are in direct contact, or may include that the first and second features are not in direct contact but in contact through other features between them. Moreover, the first feature being "on", "at the upper side of", and "on the upper surface of" the second feature includes that the first feature is right above and at the oblique upper side of the second feature, or only indicates that the horizontal height of the first feature is greater than that of the second feature. The first feature being "below", "at the lower side of", and "on the lower surface of" the second feature includes that the first feature is right below and at the oblique lower side of the second feature, or only indicates that the horizontal height of the first feature is less than that of the second feature.

In addition, the terms "horizontal", "vertical", and the like do not mean that the component is required to be absolutely horizontal or overhanging, but may be slightly inclined. For example, "horizontal" only means that its direction is more horizontal than "vertical", and it does not mean that the structure must be completely horizontal, but can be slightly inclined.

In the description of the present disclosure, it should be also noted that unless otherwise explicitly defined and defined, the terms "arranged", "coupled" and "connected" shall be understood broadly, and may be, for example, fixedly connected, or detachably connected, or integrally connected, or mechanically connected, or electrically connected, or directly connected, or indirectly connected through an intermediate medium, or interconnection between two elements. Those of ordinary skill in the art can understand the specific meanings of the above terms in the present disclosure according to specific situations.

First Embodiment

Figure 2:
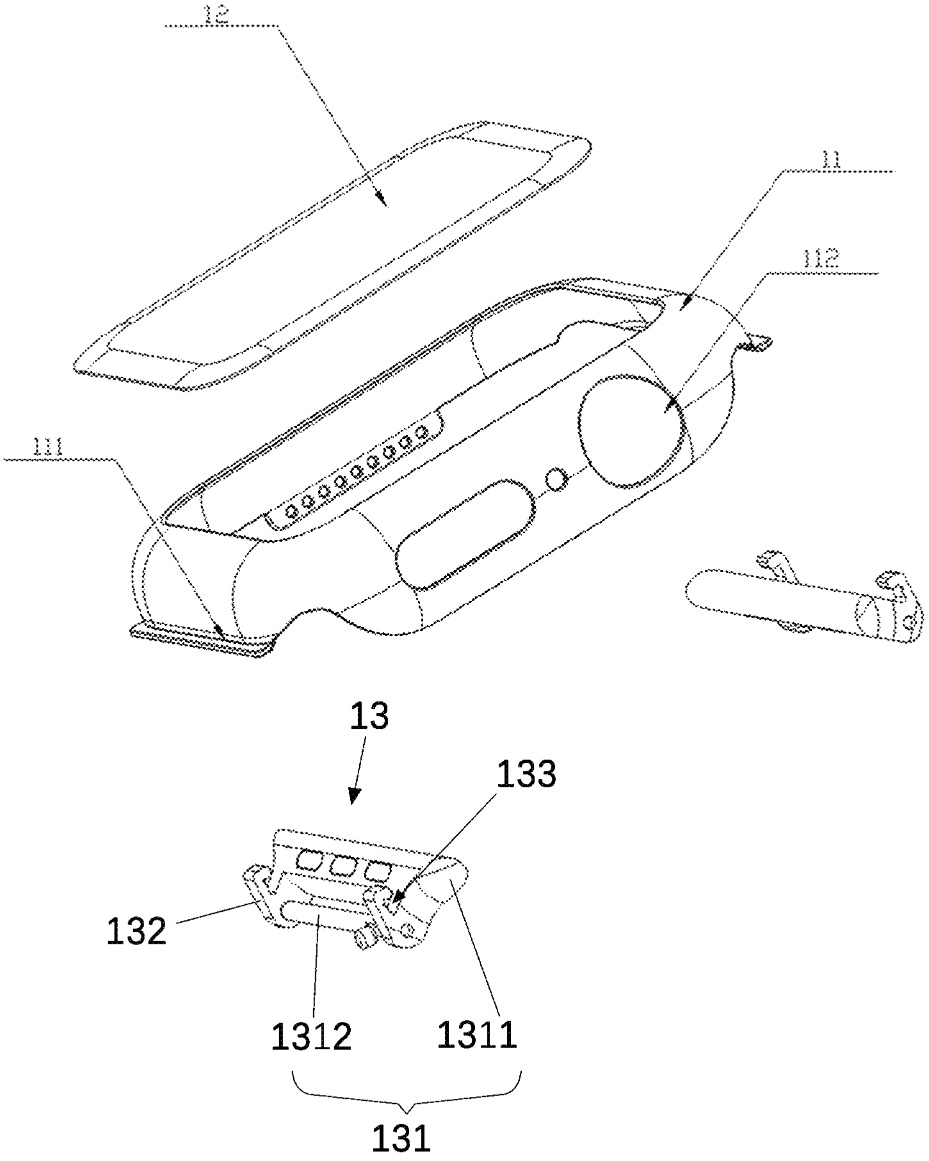
FIG. 2 is a schematic exploded structural diagram of the first embodiment of the smart watch protective shell of the present disclosure shown in FIG. 1.

Referring to FIG. 1 and FIG. 2, in this embodiment, a smart watch protective shell of the present disclosure mainly includes a first main shell 11, a first upper shell 12 and two first connectors 13; the first main shell 11 is a hollow cavity which is covered on a smart watch; the first main shell 11 mainly wraps a smart watch shell for protection; and the first upper shell 12 is arranged on the first main shell 11. Specifically, the first upper shell 12 is a protective film. The two first connectors 13 are respectively detachably connected to two ends of the smart watch. Two ends of the first main shell 11 are respectively detachably connected to the corresponding first connectors 13.

Referring to FIG. 2, in this embodiment, two opposite sides of the first main shell 11 are respectively symmetrically provided with two first snap-in blocks 111; the two first snap-in blocks 111 are detachably connected to the corresponding first connectors 13, thus fixing the first main shell 11. The two first snap-in blocks 111 are integrated with the first main shell 11. A side edge of the first main shell 11 is provided with a plurality of first through holes 112. The positions of the plurality of first through holes 112 respectively correspond to a protruding portion on a side edge of the smart watch. A material of the first main shell 11 is metal or resin. In this embodiment, the material of the first main shell 11 is metal. The first upper shell 12 is a tempered glass screen protector which is stuck to an upper side of the first main shell 11. In this embodiment, each first connector 13 includes a first adapter 131, at least one extending portion 132 extending out from the first adapter 131 and at least one first snap-in slot 133 defined between the extending portion 132 and the first adapter 131; one end of the first adapter 131 is provided with a first fixed portion 1311 detachably connected to the side edge of the smart watch; another end of the first adapter 131 is detachably provided with a first fixed shaft 132. The first fixed portion 1311 is used for fixing the first adapter 131 on the side edge of the smart watch; the first fixed shaft 1312 is detachably connected to a corresponding watchband; and the at least one first snap-in slot 133 respectively cooperates with the corresponding first snap-in block 111 to fixedly mount the first main shell 11 on the smart watch. Specifically, the two first snap-in slots 133 are symmetrically arranged on the first adapter 131.

Second Embodiment

Figure 3:
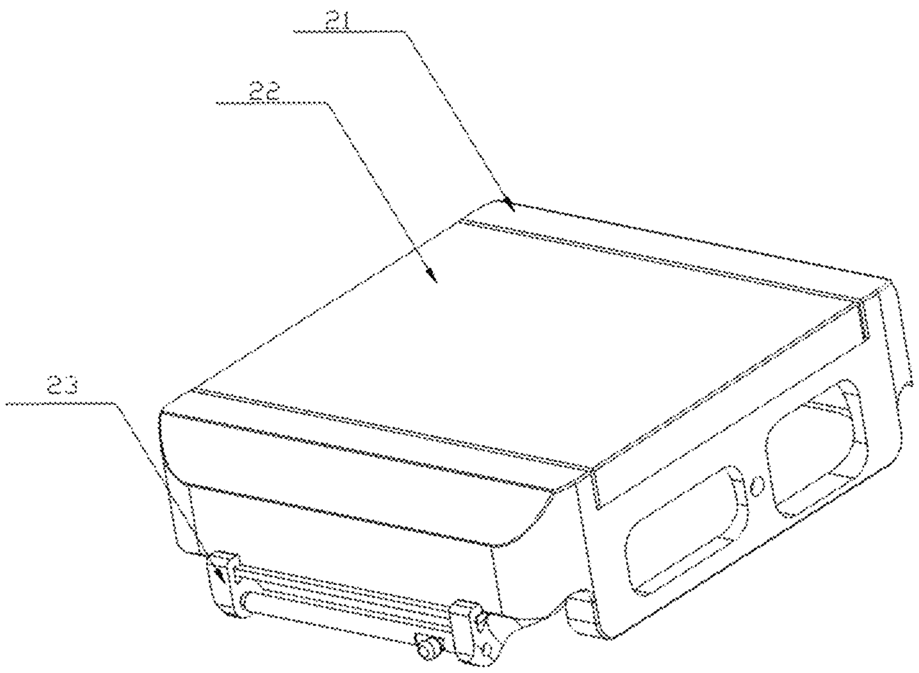
FIG. 3 is a schematic three-dimensional structural diagram of a second embodiment of a smart watch protective shell of the present disclosure.
Figure 4:
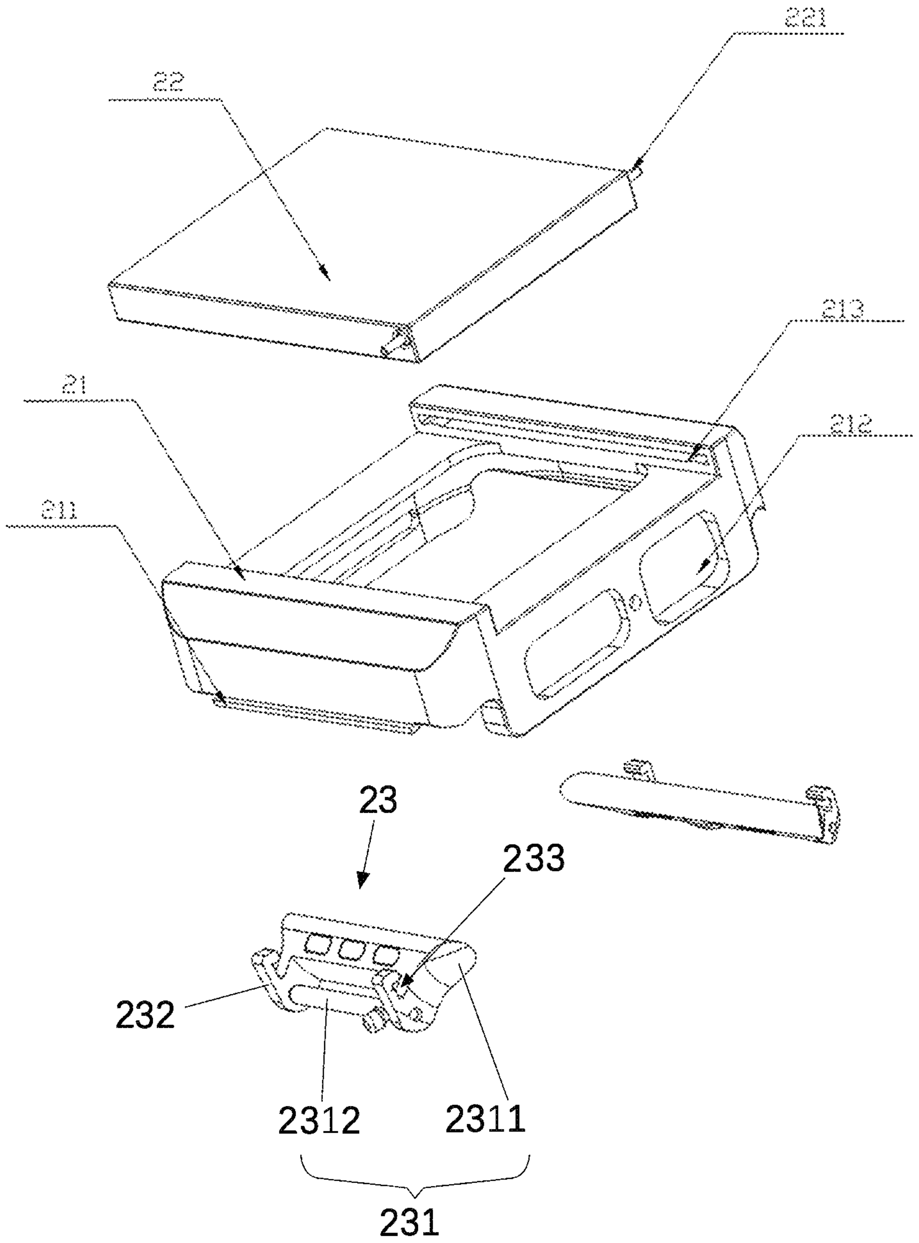
FIG. 4 is a schematic exploded structural diagram of the second embodiment of the smart watch protective shell of the present disclosure shown in FIG. 3.

Referring to FIG. 3 and FIG. 4, in this embodiment, a smart watch protective shell of the present disclosure mainly includes a second main shell 21, a second upper shell 22 and two second connectors 23; the second main shell 21 is a hollow cavity which is covered on a smart watch; the second main shell 21 mainly wraps a smart watch shell for protection; and the second upper shell 22 is movably arranged on the second main shell 21. Specifically, the second upper shell 22 is a decorative member. The two second connectors 23 are respectively detachably connected to two ends of the smart watch. Two ends of the second main shell 21 are respectively detachably connected to the corresponding second connectors 23.

Referring to FIG. 4, in this embodiment, two opposite sides of the second main shell 21 are respectively symmetrically provided with two second snap-in blocks 211; the two second snap-in blocks 211 are detachably connected to the corresponding second connectors 23, thus fixing the second main shell 21. The two second snap-in blocks 211 are integrated with the second main shell 21. A side edge of the second main shell 21 is provided with a plurality of second through holes 212. The positions of the plurality of second through holes 212 respectively correspond to a protruding portion on a side edge of the smart watch. The second main shell 21 is provided with two sliding slots 213, and the two sliding slots 213 are symmetrically disposed in parallel. A material of the second main shell 21 is metal or resin. In this embodiment, the material of the second main shell 21 is metal. A material of the second upper shell 22 is crystal, resin, metal, zircon or agate. A side edge of the second upper shell 22 is provided with a sliding shaft 221; and the sliding shaft 221 can move on the two siding slots 213, so that the second upper shell 22 moves relative to the second main shell 21, which is convenient for a user to watch the content of a watch face and protect the watch face. In this embodiment, each second connector 23 includes a second adapter 231, at least one second extending portion 232 extending out from the second adapter 231 and at least one second snap-in slot 233 defined between the second extending portion 232 and the second adapter 231; one end of the second adapter 231 is provided with a second fixed portion 2311 detachably connected to the side edge of the smart watch; another end of the second adapter 231 is detachably provided with a second fixed shaft 232. The second fixed portion 2311 is used for fixing the second adapter 231 on the side edge of the smart watch; the second fixed shaft 2312 is connected to a corresponding watchband; and the at least one second snap-in slot 233 respectively cooperates with the corresponding second snap-in block 211 to fixedly mount the second main shell 21 on the smart watch. Specifically, the two second snap-in slots 233 are symmetrically arranged on the second adapter 231.

Third Embodiment

Figure 5:
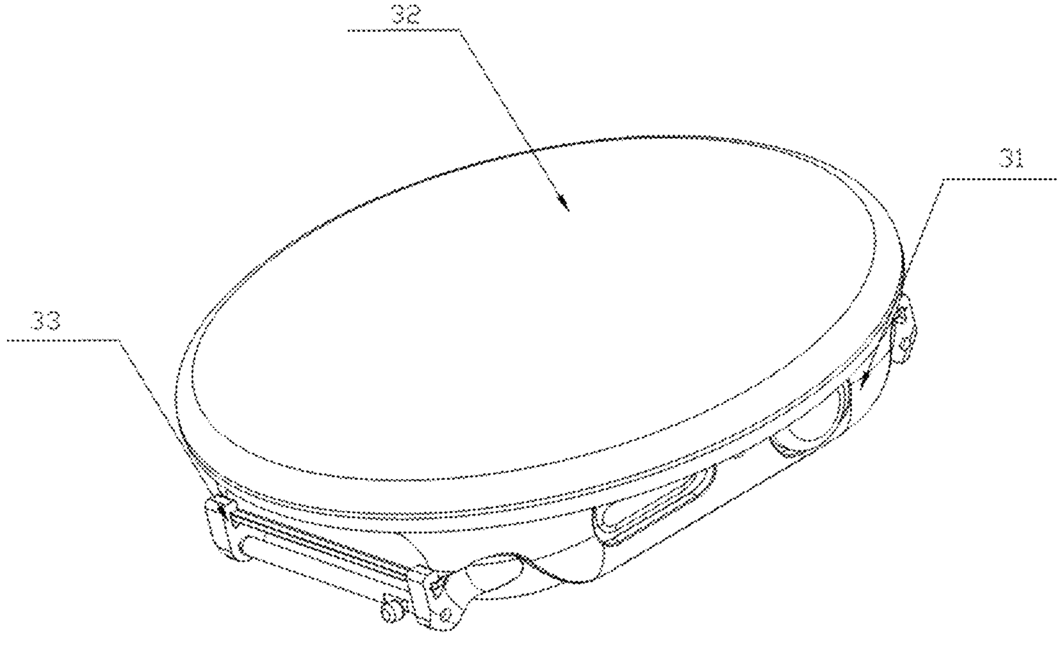
FIG. 5 is a schematic three-dimensional structural diagram of a third embodiment of a smart watch protective shell of the present disclosure.
Figure 6:
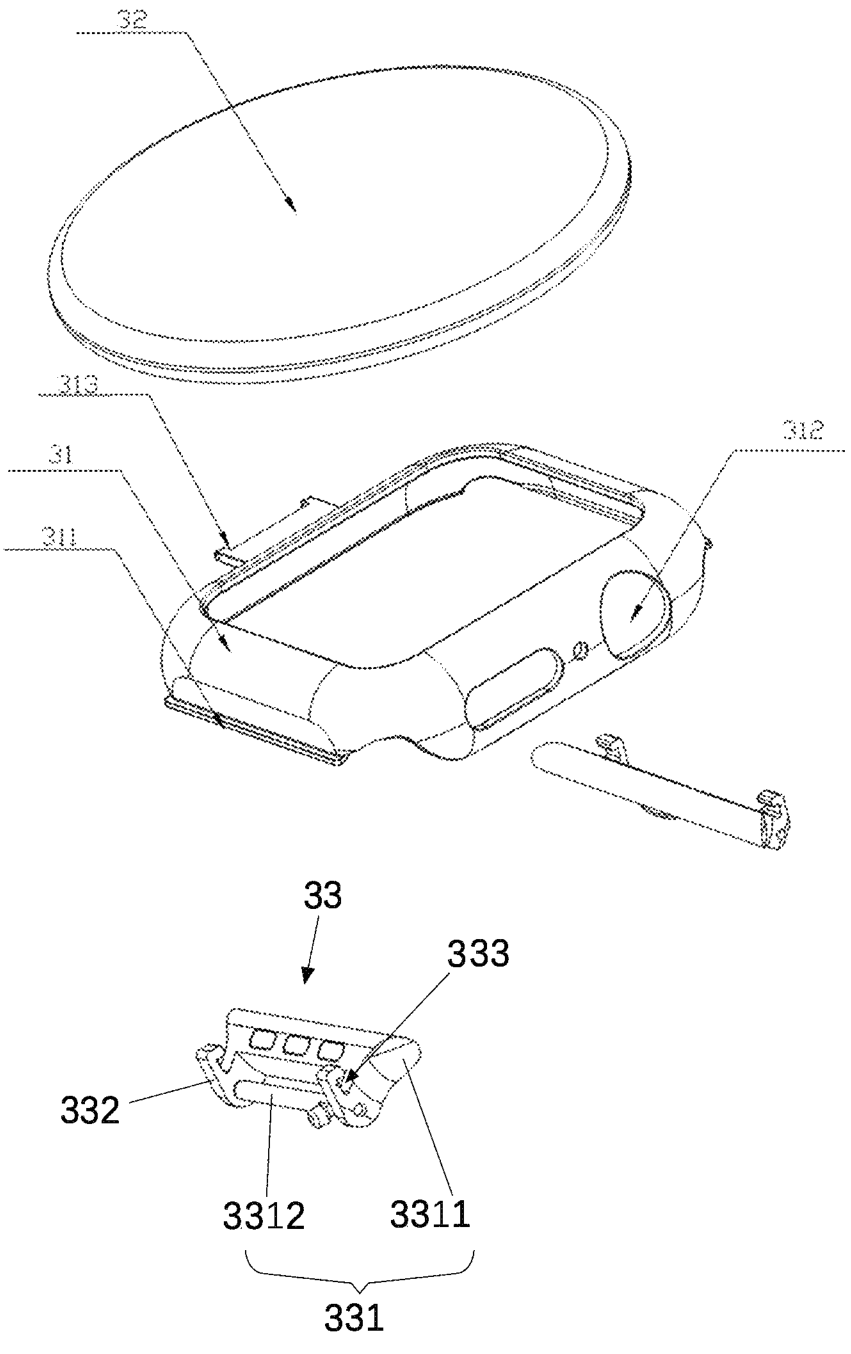
FIG. 6 is a schematic exploded structural diagram of the third embodiment of the smart watch protective shell of the present disclosure shown in FIG. 5.

Referring to FIG. 5 and FIG. 6, in this embodiment, a smart watch protective shell of the present disclosure mainly includes a third main shell 31, a third upper shell 32 and two third connectors 33; the third main shell 31 is a hollow cavity which is covered on a smart watch; the third main shell 31 mainly wraps a smart watch shell for protection; and the third upper shell 32 is movably arranged on the third main shell 31. Specifically, the third upper shell 32 is a decorative member. The two third connectors 33 are respectively detachably connected to two ends of the smart watch. Two ends of the third main shell 31 are respectively detachably connected to the corresponding third connectors 33.

Referring to FIG. 6, in this embodiment, two opposite sides of the third main shell 31 are respectively symmetrically provided with two third snap-in blocks 311; the two third snap-in blocks 311 are detachably connected to the corresponding third connectors 33, thus fixing the third main shell 31. The two third snap-in blocks 311 are integrated with the third main shell 31. A side edge of the third main shell 31 is provided with a plurality of third through holes 312. The positions of the plurality of third through holes 312 respectively correspond to a protruding portion on a side edge of the smart watch. A side edge of the third main shell 31 is provided with a rotating shaft 313; the third upper shell 32 can rotate through the rotating shaft 313 relative to the third main shell 31, which is convenient for a user to watch content of a watch face and protect the watch face. A material of the third main shell 31 is metal or resin. In this embodiment, the material of the third main shell 31 is metal. The third upper shell 32 is crystal, resin, metal, zircon or agate. In this embodiment, each third connector 33 includes a third adapter 331, at least one third extending portion 332 extending out from the third adapter 331 and at least one third snap-in slot 333 defined between the third extending portion 332 and the third adapter 331; one end of the third adapter 331 is provided with a third fixed portion 3311 detachably connected to the side edge of the smart watch; another end of the third adapter 331 is detachably provided with a third fixed shaft 332. The third fixed portion 3311 is used for fixing the third adapter 331 on the side edge of the smart watch; the third fixed shaft 3312 is connected to a corresponding watchband; and the at least one third snap-in slot 333 respectively cooperates with the corresponding third snap-in block 311 to fixedly mount the third main shell 31 on the smart watch. Specifically, the two third snap-in slots 333 are symmetrically arranged on the third adapter 331.

Fourth Embodiment

Figure 7:
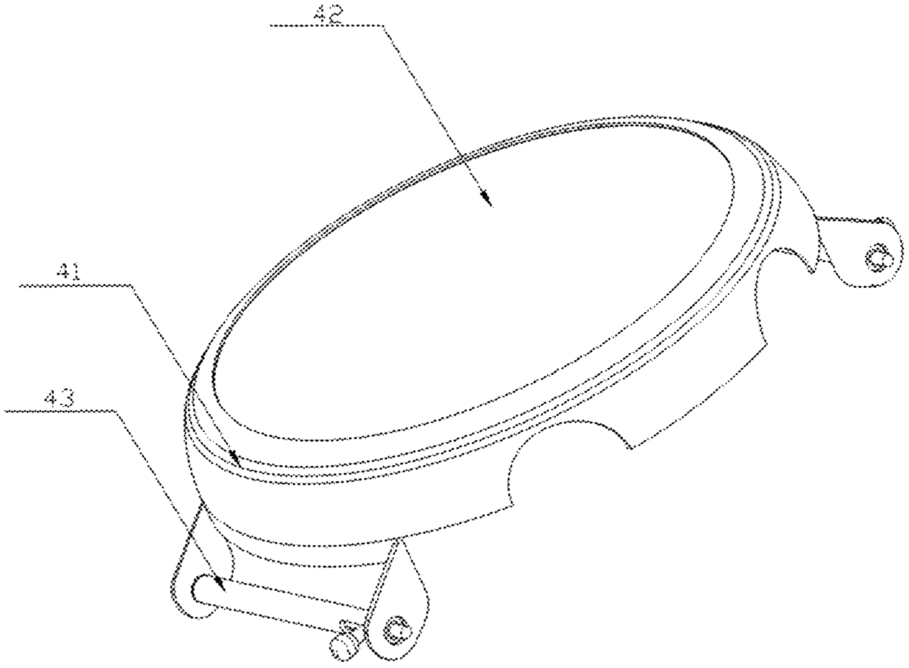
FIG. 7 is a schematic three-dimensional structural diagram of a fourth embodiment of a smart watch protective shell of the present disclosure.
Figure 8:
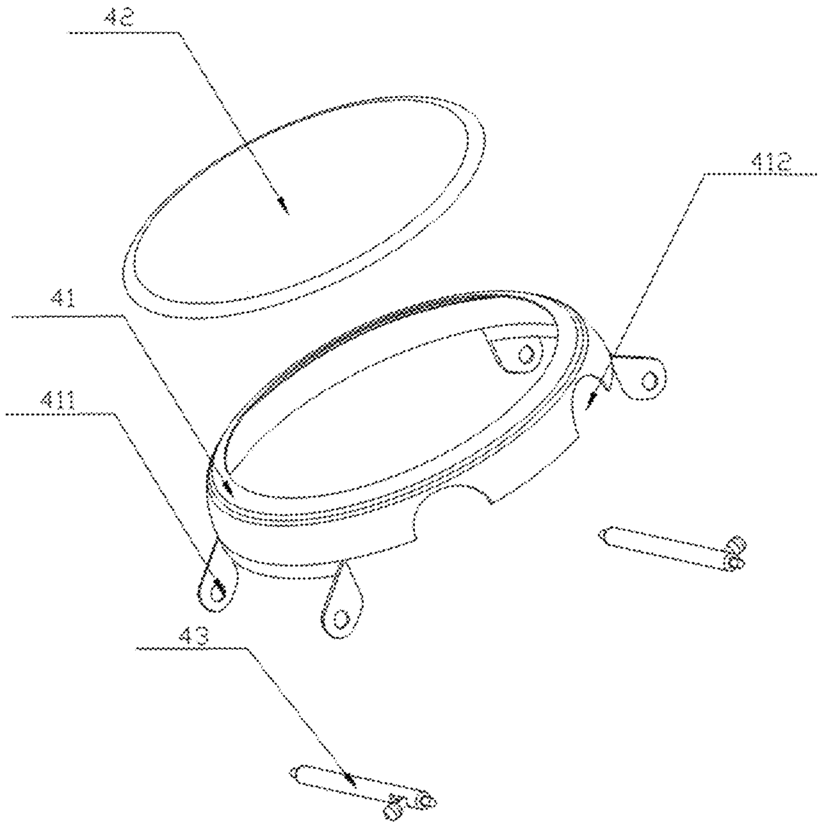
FIG. 8 is a schematic exploded structural diagram of the fourth embodiment of the smart watch protective shell of the present disclosure shown in FIG. 7.

Referring to FIG. 7 and FIG. 8, in this embodiment, a smart watch protective shell of the present disclosure mainly includes a fourth main shell 41, a fourth upper shell 42 and two fourth connectors 43; the fourth main shell 41 is a hollow cavity which is covered on a smart watch; the fourth main shell 41 mainly wraps a smart watch shell for protection; and the fourth upper shell 42 is arranged on the fourth main shell 41. Specifically, the fourth upper shell 42 is a protective film. The two fourth connectors 43 are respectively detachably connected to two ends of the smart watch. Two ends of the fourth main shell 41 are respectively detachably connected to the corresponding fourth connectors 43.

Referring to FIG. 8, in this embodiment, the fourth main shell 41 is symmetrically provided with four fixed feet 411; the four fixed feet 411 are detachably connected to the corresponding fourth connectors 43, thus fixing the fourth main shell 41. The four fixed feet 411 are integrated with the fourth main shell 41. A side edge of the fourth main shell 41 is provided with a plurality of fourth through holes 412. The positions of the plurality of fourth through holes 412 respectively correspond to a protruding portion on a side edge of the smart watch. A material of the fourth main shell 41 is metal or resin. In this embodiment, the material of the fourth main shell 41 is metal. The fourth upper shell 42 is a tempered glass screen protector which is stuck to an upper side of the fourth main shell 41. In this embodiment, the fourth connectors 43 are fixed shafts which are arranged on the side edge of the smart watch; the four fixed feet 411 are respectively detachably connected to side edges of the corresponding fixed shafts; and the fixed shafts are connected to a corresponding watchband.

The technical features of the embodiments described above can be arbitrarily combined. In order to make the description concise, all possible combinations of various technical features in the above embodiments are not completely described. However, the combinations of these technical features should be considered as the scope described in the present specification as long as there is no contradiction in them.

The above-mentioned embodiments only express several implementation modes of the present disclosure, and their descriptions are more specific and detailed, but they cannot be understood as limiting the patent scope of the present disclosure. It should be noted that those of ordinary skill in the art can further make various transformations and improvements without departing from the concept of the disclosure, and these transformations and improvements all fall within the protection scope of the present disclosure. Therefore, the protection scope of the patent of the present disclosure shall be subject to the appended claims.

What is claimed is:

1. A smart watch protective shell, comprising:

a main shell which is a hollow cavity used for wrapping a smart watch and protecting the smart watch from being damaged;

an upper shell which is arranged on the main shell, wherein a user watches content on a watch face of the smart watch through the upper shell;

two connectors respectively detachably connected to two ends of the smart watch, wherein two ends of the main shell are respectively detachably connected to the corresponding connectors to fixedly cover the main shell on the smart watch;

wherein two opposite sides of the main shell are respectively symmetrically provided with snap-in blocks; the two snap-in blocks are respectively detachably connected to the corresponding connectors; and wherein each connector comprises an adapter and at least one extending portion formed on a side of the adapter opposite to the main shell, wherein at least one snap-in slot is defined between the at least one extending portion and the adapter; both the extending portion and the snap-in blocks are arranged outside the hollow cavity; the adapter is detachably connected to a side edge of the smart watch; and the at least one snap-in slot is configured to be engaged with the corresponding snap-in block to fixedly cover the main shell on the smart watch.

2. The smart watch protective shell according to claim 1, wherein a side edge of the main shell is provided with a plurality of through holes, and positions of the plurality of through holes respectively correspond to a protruding portion on a side edge of the smart watch.

3. The smart watch protective shell according to claim 1, wherein the connector is provided with a fixed portion arranged on one end of the adapter to fix the adapter on the side edge of the smart watch; and another end of the adapter opposite to the first fixed shaft is provided with a fixed shaft detachably connected with a corresponding watchband.

4. The smart watch protective shell according to claim 1, wherein the at least one snap-in slot comprises two snap-in slots symmetrically formed in the adapter and respectively cooperate with the corresponding snap-in blocks to fixedly cover the main shell on the smart watch.

5. The smart watch protective shell according to claim 1, wherein the upper shell is movably arranged on the main shell; the upper shell is a decorative member; and the content of the watch face of the smart watch can be observed by opening the upper shell.

6. The smart watch protective shell according to claim 5, wherein two sliding slots are symmetrically formed in the main shell in parallel; a side edge of the upper shell is provided with a sliding shaft; and the sliding shaft can move on the two siding slots, so that the upper shell moves relative to the main shell, which is convenient for watching the content of the watch face of the smart watch.

7. The smart watch protective shell according to claim 6, wherein a material of the upper shell is crystal, resin, metal, zircon or agate.

8. The smart watch protective shell according to claim 5, wherein the side edge of the main shell is provided with a rotating shaft; and the upper shell is capable of rotating through the rotating shaft relative to the main shell, which is convenient for watching the content of the watch face of the smart watch.

9. The smart watch protective shell according to claim 1, wherein the upper shell is a protective film.

10. The smart watch protective shell according to claim 9, wherein the upper shell is a tempered glass screen protector.

11. The smart watch protective shell according to claim 1, wherein a material of the main shell is a metal or resin.

* * * * *